US008270538B2

(12) United States Patent
Shin et al.

(10) Patent No.: US 8,270,538 B2
(45) Date of Patent: Sep. 18, 2012

(54) APPARATUS FOR CONTROLLING SENSITIVITY BY USING DIGITAL GATING IN RECEIVER AND RECEIVER WITH THE SAME

(75) Inventors: Sangho Shin, Seongnam (KR); Sang-Hyun Cho, Daejeon (KR); Seok-Oh Yun, Daejeon (KR); Jong-Moon Kim, Daejeon (KR)

(73) Assignee: Phychips Inc. (KR)

( * ) Notice: Subject to any disclaimer, the term of this patent is extended or adjusted under 35 U.S.C. 154(b) by 792 days.

(21) Appl. No.: 12/467,627

(22) Filed: May 18, 2009

(65) Prior Publication Data

US 2009/0316834 A1   Dec. 24, 2009

(30) Foreign Application Priority Data

Jun. 20, 2008 (KR) .......... 10-2008-0058656
Jun. 20, 2008 (KR) .......... 10-2008-0058657

(51) Int. Cl.
*H03D 1/24* (2006.01)

(52) U.S. Cl. .................................. 375/320

(58) Field of Classification Search .......... 375/320, 375/260, 316, 319, 341; 331/158, 179; 327/105, 327/107, 156, 159
See application file for complete search history.

(56) References Cited

U.S. PATENT DOCUMENTS 6,066,989 A * 5/2000 Knecht et al. ............... 331/18
2008/0019422 A1 * 1/2008 Smith et al. ................. 375/136

FOREIGN PATENT DOCUMENTS

| JP | 2001007720 | 1/2001 |
| JP | 2004064328 | 2/2004 |
| JP | 2006311285 | 11/2006 |

* cited by examiner

*Primary Examiner* — Khai Tran
(74) *Attorney, Agent, or Firm* — The Belles Group, P.C.

(57) ABSTRACT

Disclosed is a wireless communication system, more particularly, a receiver and a chipset for DSRC. A receiver includes: a low noise amplifier (LNA) amplifying a received radio (RF) signal while minimizing amplification of noise included in the received RF signal; a mixer down-converting a frequency of an output signal of the LNA to output an intermediate frequency (IF) signal; a frequency synthesizer generating and outputting a frequency signal for the frequency-down conversion of the mixer to the mixer; a bandpass filter passing a necessary band of a channel in an output signal of the mixer; a log amplifier amplifying an output signal of the bandpass filter in log scale and outputting a received signal strength indicator of an output signal of the bandpass filter; a detector comparing an output of the log amplifier with a predetermined binary threshold value, outputting a first binary signal when the output of the log amplifier is less than the predetermined binary threshold value, and outputting a second binary signal when the output of the log amplifier is equal to or greater than the predetermined binary threshold value; a switch serially connected with an output terminal of the detector; and a switch controller comparing the received signal strength indicator of the output signal of the log amplifier with an RSSI threshold, opening the switch when the received signal strength indicator is less than the RSSI threshold, and closing the switch when the received signal strength indicator is equal to or grater than the RSSI threshold.

5 Claims, 4 Drawing Sheets

APPARATUS FOR CONTROLLING SENSITIVITY BY USING DIGITAL GATING IN RECEIVER AND RECEIVER WITH THE SAME

CROSS-REFERENCE TO RELATED APPLICATION

The present application claims priority under 35 U.S.C. §119(a) to Korean Patent Application Nos. 10-2008-0058656 filed on Jun. 20, 2008 and 10-2008-0058657 filed on Jun. 20, 2008, the disclosure of which is hereby incorporated by reference in its entirety as if set forth fully herein.

BACKGROUND OF THE INVENTION

1. Field of the Invention

The present invention relates to a wireless communication system, more particularly, to a receiver and a chipset for dedicated short range communication (DSRC).

2. Description of the Related Art

DSRC is dedicated short range communication. The DSRC denotes a communication manner and protocol that performs local communication without long distance interference based on an industrial/scientific/medical (ISM) band and several frequency bands. The DSRC instantaneously exchanges a large quantity of information within a distance of several to several tens of meters through bilateral wireless communication. Because the DSRC is used in a narrow zone, reuse of a frequency is possible in each zone.

In recent years, the DSRC has been widely used in the Intelligent Transportation System (ITS). An Electronic Toll Collecting System (ETCS) has been greatly highlighted as an example of the ITS. Besides, the DSRC may be used in various fields such as parking management, distribution management, oil station fee payment, or vehicle shopping.

Such a DSRC has been significantly expanding data communication between vehicle-to-vehicle or vehicle-to-infrastructure all over the world. In particular, commercial services using a 5.8 GHz carrier wave are starting to be applied to ETCS and ITS in Asian countries including Korea and Japan. Currently, base equipment installation for ETCS is substantially completed in a national expressway network of Korea. In some cities, traffic information services are provided to ordinary persons using an ITS network.

The following is a description of a protocol of DSRC in Korea.

(a) Assignment of wireless transmission carrier wave: 5800+k×10 MHz (necessity: k=0, 1, selectivity: k=4, 5)

(b) Modulation/demodulation: ASK (Amplitude Shift Keying), modulation index is equal to or greater than 75%

(c) Switching method between transmission/reception modes: Time Division Duplexing (TDD)

(d) Multiplexing technology: Frequency Division Multiplexing (FDM)+Space Division Multiplexing (SDM)

(e) Reception sensitivity range: −76 dBm (for ITS)~−40 dBm (for ETCS)

(f) Transmission output power: +10 dBm (g) Moving speed support of On-Board Equipment (OBE): higher than 160 km/h (h) Temperature variation range of OBE: −85☐~−40☐

The reception sensitivity range among the foregoing protocols is described. In a national DSRC protocol, it is required that the reception sensitivity is −76 dBm for ITS and the reception sensitivity is −40 dBm for ETCS. The reception sensitivity means a minimal signal input level that a receiver may operate according to characteristics or a performance of a receiver device. The reception sensitivity is determined based on a bit error rate (BER), which is an important factor for discriminating a performance of the receiver.

It is understood that there is a need for very rapid switching time between transmission/reception modes with excellent BER in order to perform a normal billing while an OBE is also moving a narrow ETCS zone at high speed. As a part of multiplexing technology, the use of an SDM means that an undesirable interference signal may be generated from an adjacent ETCS cell. Accordingly, so as to prevent this, there is a demand for the delicate control of transmission and received powers within a wide temperature variation.

A free sensitivity control function of a wide area in a design specification of the OBE in the DSRC is an essential factor simultaneously enabling the support of ITS and ETCS. Further, in order to clearly define a communication area within a wide temperature variation range, a very delicate set of the sensitivity is required together with exact transmission power. In particular, since it is checked by an intensity of received power whether or not the OBE enters within the communication area, there is a need for more exact control of the sensitivity in the ETCS. The reason is that when the sensitivity is less than a predetermined value, the OBE attempts to communicate with a base station prior to entering the communication area to occur interference with an adjacent DSRC device. When the sensitivity is greater than the predetermined value, the communication may be performed in only a narrower area than a defined communication area to reduce available communication time.

As a conventional control method of sensitivity, there has been used a method for controlling a gain of a receiver. Namely, when controlling the gain of the receiver, a noise figure of the receiver varies. By using such a feature, a maximum reception distance satisfying a BER of the receiver is adjusted.

Figure 2:
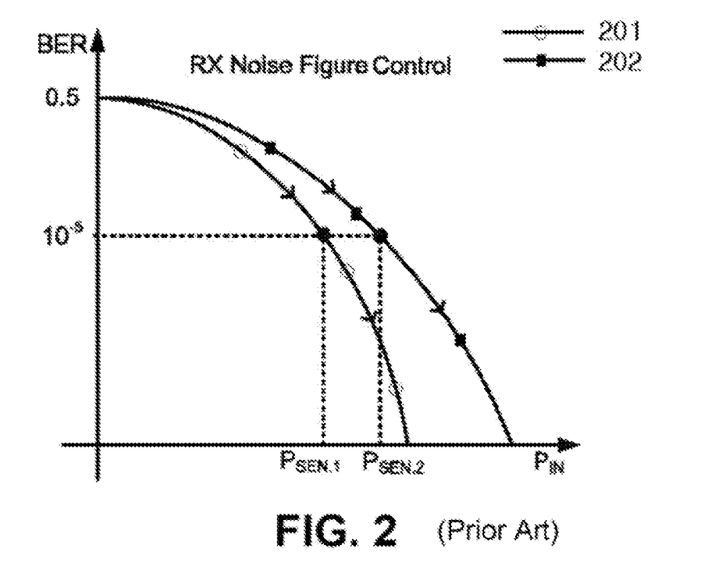
FIG. 2 is a graph illustrating received power $P_{IN}$ versus BER characteristics in a conventional method for controlling the sensitivity of a receiver.

FIG. 2 is a graph illustrating received power $P_{IN}$ versus BER characteristics in a conventional method for controlling the sensitivity of a receiver. In the graph of FIG. 2, an x axis is an intensity of a received signal, namely received power, and a y axis is a BER of the receiver upon reception of a signal having a corresponding intensity. A graph 201 is received signal intensity versus BER graph in a case where a noise figure of the receiver is NF1. A graph 202 is received signal intensity versus BER graph in a case where the noise figure of the receiver is NF2. In this case, NF1<NF2 is satisfied.

When it is required that the receiver operates where the intensity of the received signal is greater than $P_{SEN.1}$, and that the BER becomes less than $10^{-5}$ in an operation range, namely, when there is a need that the sensitivity of the receiver is $P_{SEN.1}$, the noise figure of the receiver should be set to NF1. In the same manner, when it is required that the receiver operates where the intensity of the received signal is equal to or greater than $P_{SEN.2}$, and that the BER becomes less than $10^{-5}$ in an operation range, namely, namely, when there is a need that the sensitivity of the receiver is $P_{SEN.2}$, the noise figure of the receiver should be set to NF2. That is, the noise figure of the receiver is changed according to the required sensitivity.

However, disadvantages of such a control method are as follows. Because a system noise figure of the receiver is determined as a function of gains and noise figures of all the structural circuits, it is significantly difficult to linearly control a noise figure of a specific circuit by controlling a gain or the noise figure of the specific circuit. Moreover, since the BER obtained with a maximum system performance index in a minimum input power, is obtained by artificially degrading a performance of a system when the sensitivity is set to a great value, a system of an optimal performance may be not obtained, and it is difficult to define a clear communication distance.

Meanwhile, since a conventional base station for DSRC is configured by a hybrid module configuration of high manufacturing cost and cost burden, it is implemented in a number of construction chips and external components. Accordingly, when specific design matters are changed in the base station of DSRC, the whole quantity of the base station is returned to a laboratory, so that it should be again adjusted. This causes the occurrence of a cost burden. The base station for DSRC implemented in a hybrid module configuration has a disadvantage that it may not be integrated with chips such as GPS or DMB.

Meanwhile, the conventional ASK receiver (not shown) for DSRC reception includes a low noise amplifier (LNA), a mixer, an intermediate frequency (IF) filter, an RSSI, a data comparator, and a frequency synthesizer. The IF filter is positioned in an outside of an ASK receiver chipset. In contrast to this, remaining structural elements are all positioned in an inside of the ASK receiver chipset. The reason why is that since an IF frequency of the conventional ASK receiver for DSRC reception is a high frequency of approximately 40 MHz, a surface acoustic wave (SAW) is used as the IF filter, and since a size of a filter processing a high IF frequency is large, the IF filter may not be integrated in the ASK receiver chipset.

In the ASK receiver for DSRC reception having a high IF frequency, since the IF filter is positioned in an outside of the ASK receiver chipset, it is difficult to match the ASK receiver chipset and the IF filter with each other. Moreover, a size of the ASK receiver is increased, thereby increasing a cost.

SUMMARY OF THE INVENTION

The present invention has been made in view of the above problems, and it is an object of the present invention to provide a receiver for DSRC that easily enables control of the sensitivity without degrading a performance of a system.

It is another object of the present invention to provide a chip set for DSRC that may be formed in one-chip with GPS or DMB chip by integrating a receiver for DSRC based on CMOS technology.

It is a further object of the present invention to provide an amplitude shift keying receiver for DSRC, which may be small-sized, have low-cost, have uniform characteristics of an IF filter, and in which the IF filter may easily match with remaining structural elements.

In accordance with an exemplary embodiment of the present invention, there is provided a receiver comprising: a low noise amplifier (LNA) amplifying a received radio frequency (RF) signal while minimizing amplification of noise included in the received RF signal; a mixer down-converting a frequency of an output signal of the LNA to output an intermediate frequency (IF) signal; a frequency synthesizer generating a predetermined frequency signal for the frequency-down conversion of the mixer and outputting the predetermined frequency signal to the mixer; a bandpass filter passing a necessary band of a channel in an output signal of the mixer; a log amplifier amplifying an output signal of the bandpass filter in log scale and outputting a received signal strength indicator of an output signal of the bandpass filter;

a detector comparing an output of the log amplifier with a predetermined binary threshold value, outputting a first binary signal when the output of the log amplifier is less than the predetermined binary threshold value, and outputting a second binary signal when the output of the log amplifier is equal to or greater than the predetermined binary threshold value; a switch serially connected with an output terminal of the detector; and a switch controller comparing the received signal strength indicator of the output signal of the log amplifier with an RSSI threshold, opening the switch when the received signal strength indicator is less than the RSSI threshold, and closing the switch when the received signal strength indicator is equal to or grater than the RSSI threshold.

Preferably, the switch controller includes: an analog-to-digital converter converting the received signal strength indicator into a digital signal; an RSSI threshold generator generating the RSSI threshold; and a comparator comparing the received signal strength indicator with the RSSI threshold, and opening or closing the switch according to the comparison result.

More preferably, the RSSI threshold generator includes: a temperature sensor measuring an ambient temperature; and a look-up table storing the RSSI threshold corresponding to the ambient temperature measured by the temperature sensor.

Most preferably, the receiver alternately operates in a signal reception mode receiving signals and a signal non-receiving mode receiving no signals, and the temperature sensor measures the ambient temperature once each time the signal reception mode starts.

In accordance with another embodiment of the present invention, there is provided an amplitude shift keying (ASK) receiver for designated short range communication (DSRC) receiving and converting a DSRC radio frequency (RF) signal of a 5.8 GHz band into a digital signal, comprising: a low noise amplifier (LNA) amplifying the received DSRC RF signal while minimizing amplification of noise included in the received DSRC RF signal; a mixer down-converting a frequency of an output signal of the LNA to output an intermediate frequency (IF) signal; a frequency synthesizer generating and outputting a frequency signal for the frequency-down conversion of the mixer to the mixer; a bandpass filter passing a necessary band of a channel in an output signal of the mixer; a log amplifier amplifying an output signal of the bandpass filter in log scale; and a detector comparing an output of the log amplifier with a predetermined binary threshold value, outputting a first binary signal when the output of the log amplifier is less than the predetermined binary threshold value, and outputting a second binary signal when the output of the log amplifier is equal to or greater than the predetermined binary threshold value, wherein the ASK receiver for DSRC is formed in one-chip by a complementary metal-oxide semiconductor (CMOS) process and the intermediate frequency is a 10 MHz band.

According to the present invention, the sensitivity may be easily controlled in a DSRC without degrading a performance of a system.

Further, a chip set for DSRC may be formed in one-chip with GPS or DMB chip by integrating a receiver for DSRC based on CMOS technology.

In addition, since an IF filter may be integrated with an inside of an ASK receiver chipset for DSRC, the size and cost of the ASK receiver for DSRC are reduced, characteristics of the IF filter are uniform, and the IF filter is easily matched with remaining structural elements.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Hereinafter, exemplary embodiments of the present invention are described in detail with reference to the accompanying drawings. The same reference numerals are used throughout the drawings to refer to the same or like parts. Detailed descriptions of well-known functions and structures incorporated herein may be omitted to avoid obscuring the subject matter of the present invention.

Figure 1:
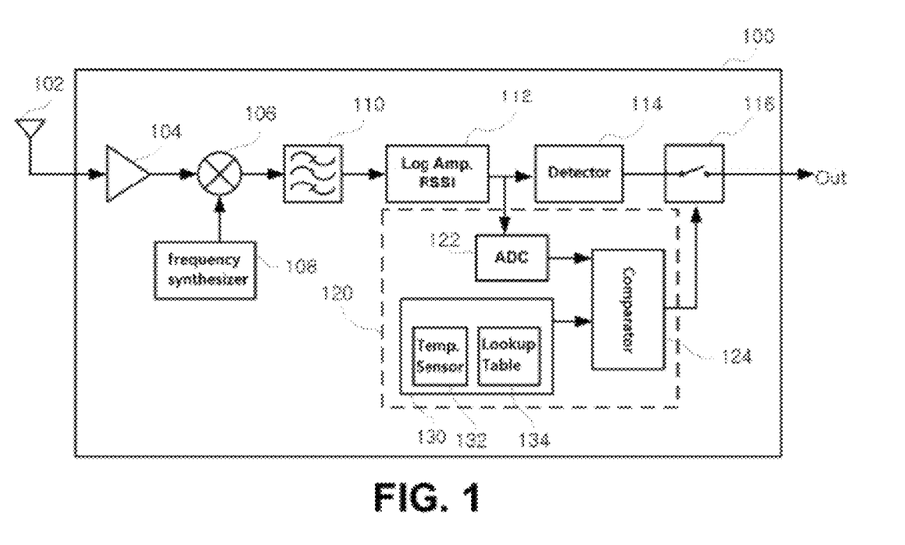
FIG. 1 is a view showing a receiver in accordance with an embodiment of the present invention.

FIG. 1 is a view showing a receiver 100 in accordance with an embodiment of the present invention.

The receiver 100 includes a low noise amplifier (LNA) 104, a mixer 106, a frequency synthesizer 108, a bandpass filter 110, a log amplifier 112, a detector 114, a switch 116, and a switch controller 120.

The LNA 104 amplifies a received radio frequency (RF) signal while minimizing amplification of noise included in the received RF signal. The amplified signal from the LNA 104 is input to the mixer 106. The mixer 106 down-converts a frequency of the amplified RF signal from the LNA 104 and outputs an intermediate frequency (IF) signal. The mixer 106 receives a local oscillator (LO) frequency signal from the frequency synthesizer 108 in order to down-convert the frequency of the amplified signal from the LNA 104. The LO frequency is set to satisfy the following equation 1.

$$|LO\ frequency \pm RF\ frequency| = IF\ frequency \quad [\text{Equation 1}]$$

The bandpass filter 110 selectively passes a necessary band of a channel in an output signal of the mixer 106. The log amplifier 112 amplifies an output signal of the bandpass filter 110 in log scale and outputs a RSSI of the output signal of the bandpass filter 110. The detector 114 compares an output of the log amplifier 112 with a predetermined binary threshold value. When the output of the log amplifier 112 is less than the predetermined binary threshold value, the detector 114 outputs a first binary signal of the binary signal. When the output of the log amplifier 112 is equal to or greater than the predetermined binary threshold value, the detector 114 outputs a second value of the binary signal. For example, the binary signal may be −1 or 1, the first value of the binary signal may be −1, and the second value of the binary signal may be 0. In addition, the binary signal may be 0 or 1, the first value of the binary signal may be 0, and the second value of the binary signal may be 1. In this case, the binary threshold value may be 0.5.

One terminal of the switch 116 is connected to an output terminal of the detector 114, and the other terminal of the switch 116 is connected to an output terminal of the receiver 100. When the switch 116 is closed, an output of the detector 114 is transferred to the output terminal of the receiver 100. When the switch 116 is opened, the output of the detector 114 is not transferred to the output terminal of the receiver 100.

The switch controller 120 compares the RSSI of the output signal of the log amplifier 112 with an RSSI threshold. When the RSSI is less than the RSSI threshold, the switch controller 120 opens the switch 116. When the RSSI is equal to or grater than the RSSI threshold, the switch controller closes the switch 116.

Namely, only when the intensity of the received signal is equal to or greater than a predetermined value, a detected result of the detector 114 is output to an outside of the receiver 100. Accordingly, unlike the related art purposely degrading a noise figure of a receiver to control an operation range of the receiver, the present invention may control the RSSI threshold of the switch controller 120 to an optional value to control an operation range of the receiver while maintaining excellent performance indexes such as a gain and a noise figure of the receiver to the highest degree.

Figure 3:
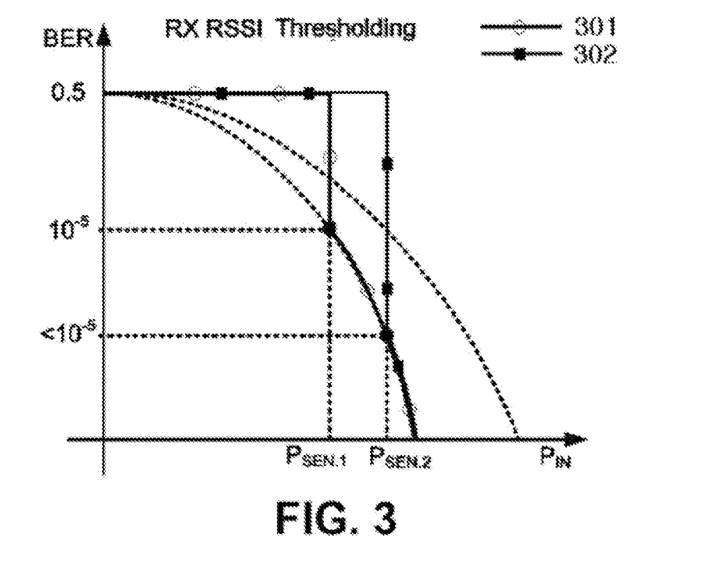
FIG. 3 is a graph illustrating received power $P_{IN}$ versus BER characteristics in a method for controlling the sensitivity of a receiver in accordance with an embodiment of the present invention.

FIG. 3 is a graph illustrating received power $P_{IN}$ versus BER characteristics in a method for controlling the sensitivity of a receiver in accordance with an embodiment of the present invention.

In the graph of FIG. 3, an x axis is an intensity of a received signal, namely received power, and a y axis is a BER of the receiver upon reception of a signal having a corresponding intensity. A graph 301 is received power versus BER feature in a case where the sensitivity of the receiver is set to $P_{SEN.1}$. A graph 302 is received power versus BER feature in a case where the sensitivity of the receiver is set to $P_{SEN.2}$.

With reference to graph 301, in a case where the sensitivity of the receiver is set to $P_{SEN1}$, when the received power is less than $P_{SEN1}$, the switch controller 120 prevents an output of the detector 114 from being transferred to the output terminal of the receiver 100 or outputs a digital signal regardless of the received signal to the output terminal of the receiver 100. Accordingly, in this case, the BER is 0.5. When the received power is equal to or greater than $P_{SEN1}$, the receiver 100 has a general BER feature according to a feature thereof.

With reference to graph 302, in a case where the sensitivity of the receiver is set to $P_{SEN2}$, when the received power is less than $P_{SEN.2}$, the switch controller 120 prevents an output of the detector 114 from being transferred to the output terminal of the receiver 100 or outputs a digital signal regardless of the received signal to the output terminal of the receiver 100. Accordingly, in this case, the BER is 0.5. When the received power is equal to or greater than $P_{SEN2}$, the receiver 100 has a general BER feature according to a feature thereof.

Upon comparison of the graph in FIG. 3 with that of FIG. 2, although the sensitivity is changed, a performance of the receiver such as the noise figure is not degraded in FIG. 3. Accordingly, when the receiver operates (BER<0.5), a received power versus BER feature in the sensitivity of the receiver having $P_{SEN2}$ corresponds to that in the sensitivity of the receiver having $P_{SEN1}$. The method of FIG. 3 may more excellent BER feature with respect to constant received power as compared with that of the related art.

In the BER feature of the related art illustrated in FIG. 2, a performance of the receiver such as the noise figure thereof is degraded to control the sensitivity. Accordingly, although the sensitivity of the receiver is increased from $P_{SEN1}$ to $P_{SEN2}$, the BER feature of the receiver in received power corresponding to the sensitivity is the same. In comparison with this, an advantage of the receiver according to the present invention may be clearly understood.

Hereinafter, a method for controlling the sensitivity in a receiver 100 according to the embodiment of the present invention will be described in detail. Referring back to FIG. 1, the switch controller 120 includes an analog-to-digital converter (ADC) 122, a RSSI threshold generator 130, and a comparator 124.

The ADC 122 converts the RSSI output from the log amplifier into a digital signal. When the RSSI is equal to or greater than a certain value, the threshold generator 130 generates an RSSI threshold for determining whether the receiver 100 is to be operated or not. The RSSI threshold generated by the RSSI threshold generator 130 is input by a manufacturer or user, or the RSSI threshold generator 130 may optionally generate operation environments of the receiver 100. The RSSI threshold generator 130 may include an I2C communication module (not shown) for communication with external devices. The RSSI threshold inside the receiver 100 may be input and/or revised.

The comparator 124 compares the RSSI output from the log amplifier 112 with the RSSI threshold output from the RSSI threshold generator 130, and outputs a control signal to the switch 116 according to the comparison result. When the RSSI is less than the RSSI threshold, the comparator 124 outputs a control signal for opening the switch 116 thereto. When the RSSI is equal to or greater than the RSSI threshold, the comparator 124 outputs a control signal for short-circuiting the switch 116 thereto. As described earlier, the switch controller 120 turns on/off the switch 116 according to the RSSI to on/off the output signal. This operation is referred to as "digital gating".

As mentioned above, in the received 100 according to the embodiment of the present invention, the sensitivity of the receiver 100 may be controlled according to the RSSI threshold generated by the RSSI threshold generator 130. That is, in the embodiment of the present invention, the sensitivity of the receiver 100 may be controlled by the digital gating. As a result, an optical control of the RSSI threshold generated by the RSSI threshold generator 130 may optionally control the sensitivity of the receiver 100.

Control of the Sensitivity According to an Ambient Temperature

Next, with reference to FIG. 1, an RSSI threshold generator 130 of the receiver 100 according to another embodiment of the present invention includes a temperature sensor 132 and a look-up table 134. The temperature sensor 132 measures an ambient temperature of an OBU including the receiver 100. The look-up table 134 stores an RSSI threshold corresponding to a temperature. The look-up table 134 includes a storage unit storing temperatures and RSSI thresholds corresponding thereto. The RSSI threshold corresponding to the temperature may be input during production of the receiver 100 or by a user during a use of the receiver 100. The RSSI threshold corresponding to the temperature may be suitably selected and input according to used applications or environments.

The RSSI threshold generator 130 finds out the RSSI threshold corresponding to the temperature measured by the temperature sensor 132 from the look-up table 134, and outputs it to the comparator 124.

Since a suitable RSSI threshold is selected and used according to the ambient temperature, a system performance may be maintained substantially constant regardless of the ambient temperature. Accordingly, the receiver 100 according to the embodiment of the present invention may be stably used in a vehicle having a significantly great temperature range change.

Low-Noise Clocking of Temperature Compensation Circuit

The following is a description of a low-noise clocking feature that a temperature sensor 132 included in the receiver 100 according to another embodiment of the present invention has. The temperature sensor 132 converts a general temperature being analog information into digital temperature information. In this case, a used sampling clock of the ADC may be interfered with transmission and reception signals. Accordingly, the temperature sensor 132 periodically updates temperature information in a reception standby mode in order to block the occurrence of such interference. However, in a reception mode (RX-mode) or a transmission mode (TX-mode), the temperature sensor 132 updates the temperature information in only a case where the reception mode or the transmission mode starts.

Figure 4:
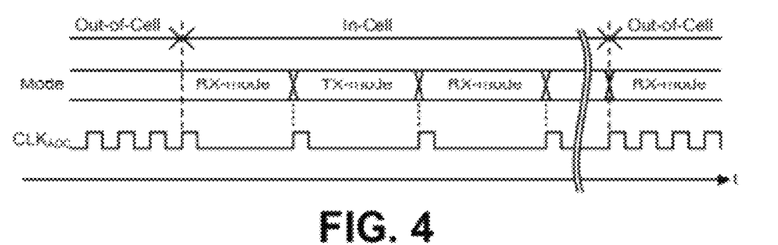
FIG. 4 is a timing diagram of a clock provided to a temperature sensor according to transmission and reception modes of a DSRC including the receiver in accordance with an embodiment of the present invention.

FIG. 4 is a timing diagram of a clock provided to a temperature sensor according to transmission and reception modes of DSRC including the receiver in accordance with an embodiment of the present invention.

In FIG. 4, a section other than the reception mode (RX-mode) or the transmission mode (TX-mode) is a transmission/reception stand by mode. It is understood that a clock $CLK_{ADC}$ is periodically supplied to the ADC of the temperature sensor 132 in the transmission/reception stand by mode. However, in the transmission mode (TX-mode), the clock $CLK_{ADC}$ is supplied in only a moment that the transmission mode (TX-mode) starts. In the same manner, in the reception mode (RX-mode), the clock $CLK_{ADC}$ is supplied in only a moment that the reception mode (RX-mode) starts.

DSRC Transmission/Reception Chip Set

Figure 5:
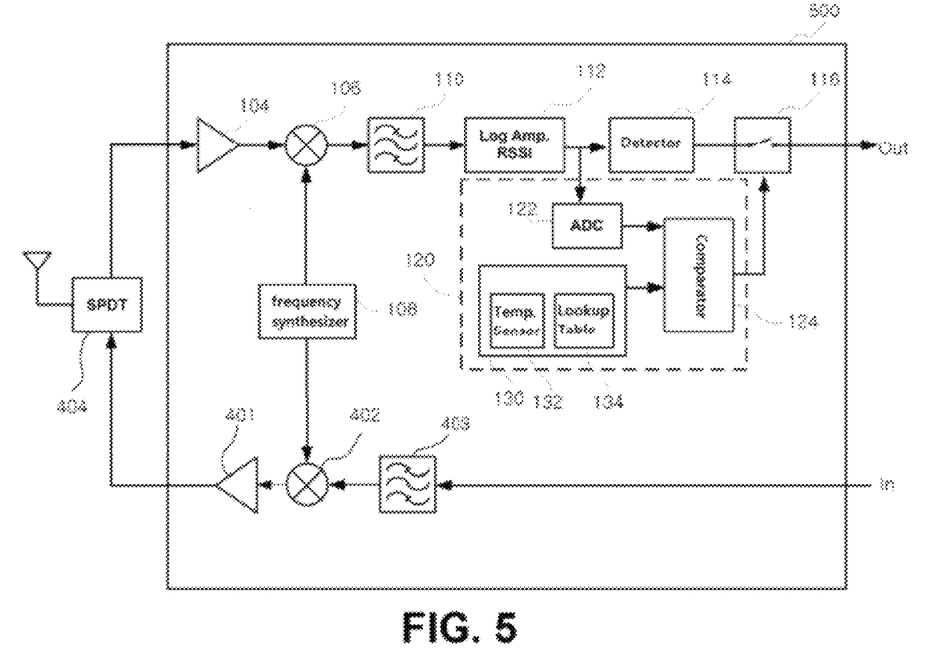
FIG. 5 is a block diagram illustrating a DSRC chip set in accordance with another embodiment of the present invention.

A DSRC chip set 500 including the receiver 100 in accordance with the embodiment of the present will be now described with reference to FIG. 5. FIG. 5 is a block diagram illustrating a DSRC chip set 500 in accordance with another embodiment of the present invention. Description of the same internally structural elements of the DSRC chip set 500 as those of the receiver 100 are omitted. The DSRC chip set 500 further includes a power amplifier 401, a mixer 402, and a pulse shaping filter 403.

A digital signal to be transmitted from an exterior of the DSRC chip set 500 is input to an input terminal In of the DSRC chip 500. A bandwidth of the input signal is limited by the pulse shaping filter 403. Next, an output signal of the pulse shaping filter 403 is frequency-up converted by the mixer 402. An LO frequency signal is supplied from the frequency synthesizer 108 to the mixer 402 for the frequency-up conversion. The frequency-up converted signal by the mixer 402 is amplified by the power amplifier 401 in amplitude.

An SPTP switch 404 is coupled to an exterior of the DSRC chip set 500, and couples the DSRC chip set 500 to an antenna according to a transmission/reception mode.

As discussed earlier, a transmission stage and a reception stage of the DSRC chip set 500 are included in one single chip, and a single frequency synthesizer 108 provides the LO frequency signal to be supplied to the transmission stage and the reception stage, thereby reducing a chip area. Further, because a transceiver for DSRC is integrated based on complementary metal-oxide semiconductor (CMOS) technology, it may be readily integrated in one chip together with a GPS or DMS chip.

IF Frequency

In another embodiment of the present, 10 MHz band may be selected as an IF frequency of the receiver 100. When the 10 MHz band is selected as the IF frequency of the receiver 100, because the bandpass filter 203 has a relatively low pass band by approximately 10 MHz, it may be integrated in one chip by a CMOS process. Since the 10 MHz band is used as the IF frequency, an image elimination circuit is not required.

Figure 6:
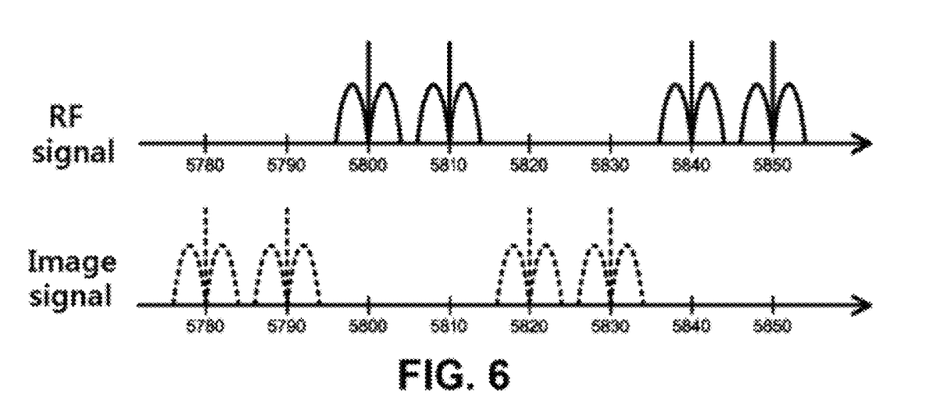
FIG. 6 is a waveform diagram showing waveforms of an RF signal and an image signal received and processed by the receiver in accordance with the present invention.

FIG. 6 is a waveform diagram showing waveforms of an RF signal and an image signal received and processed by the receiver 100 according to the present invention.

An RF signal denotes a radio frequency signal for DSRC based on a DSRC standard protocol. A center frequency of the RF signal is 5800 MHz, 5810 MHz, 5840 MHz, or 5850 MHz. When 10 MHz is set to the IF frequency, an LO frequency is 5790 MHz, 5800 MHz, 5830 MHz, or 5840 MHz in a low-side LO injection. Accordingly, in respective RF signals, a 5780 MHz, 5790 MHz, 5820 MHz, or 5830 MHz band signal is converted into a 10 MHz IF frequency signal as an image signal. However, since a signal is not allotted to 5820 MHz and 5830 MHz bands, and 5780 MHz and 5790 MHz and these bands are bands beyond a band range defined in the DSRC standard protocol, an image elimination circuit for the image signal is unnecessary. In the same manner, in an up-side LO injection, because a frequency band of an image signal is a band in which a signal is not assigned in a standard protocol or a frequency band beyond the band range defined in the DSRC standard protocol, the image elimination circuit is unnecessary. As a result, the size and a cost of the receiver 100 may be reduced.

Figure 7:
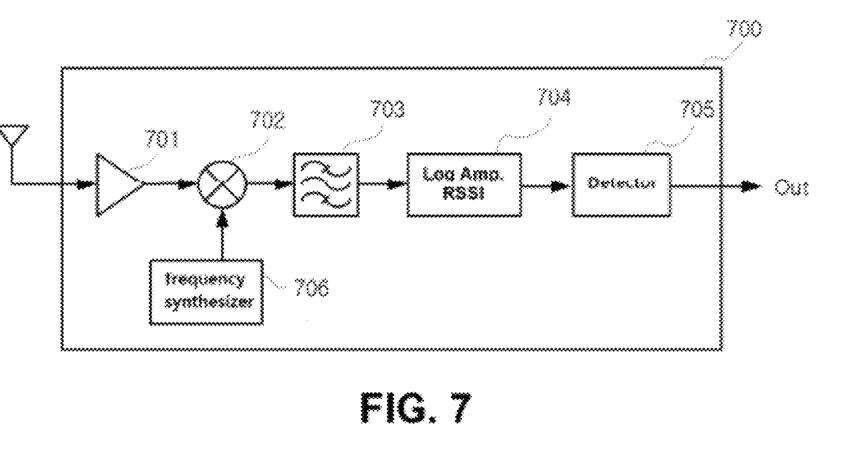
FIG. 7 is a block diagram showing an ASK receiver 200 for the DSRC in accordance with an embodiment of the present invention.

FIG. 7 is a block diagram showing an ASK receiver 200 for DSRC in accordance with an embodiment of the present invention. The ASK receiver 700 is an amplitude shift key (ASK) receiver, which receives and converts a designated short range communication (DSRC) radio frequency (RF) signal of a 5.8 GHz band into a digital signal. In this case, the 5.8 GHz band is a band including carriers in which a carrier center frequency is 5800 MHz+k*10 MHz (k=0, 1, 4, or 5), and a band of each carrier is within approximately 10 MHz. The ASK receiver 700 for DSRC includes a low noise amplifier (LNA) 701, a mixer 702, a bandpass filter 703, a log amplifier 704, a detector 705, and a frequency synthesize 706. The LNA 701 amplifies a received DSRC RF signal of 5.8 GHz while minimizing amplification of noise included in the received DSRC RF signal. The mixer 702 down-converts a frequency of an output signal of the LNA 201 and outputs an intermediate frequency (IF) signal. The frequency synthesizer 706 generates and outputs a frequency signal for the frequency-down conversion of the mixer 702 to the mixer 702. In the ASK receiver 700 in accordance with the present invention, the IF is 10 MHz. Accordingly, in order to down-convert an RF frequency signal of 5.8 GHz into an IF frequency, an LO frequency should satisfy the forgoing equation 2.

|LO frequency±RF frequency|=IF frequency  [Equation 2]

The bandpass filter 703 passes a necessary band of a channel in an output signal of the mixer 702. The log amplifier 704 amplifies an output signal of the bandpass filter 703 in log scale, and outputs a level of Received signal strength indicator (RSSI) of the output signal from the bandpass filter 703. The detector 205 compares an output of the log amplifier 704 with a predetermined binary threshold value. When the output of the log amplifier 204 is less than the predetermined binary threshold value, the detector 705 outputs a first binary signal. When the output of the log amplifier 704 is equal to or greater than the predetermined binary threshold value, the detector 205 outputs a second binary signal. For example, when the binary signal is −1 or 1, a first value of the binary signal is −1, and a second value of the binary signal is 0, a binary threshold value may be 0. In contrast to this, when the binary signal is 0 or 1, the first value of the binary signal is 0, and the second value of the binary signal is 1, the binary threshold value may be 0.5.

The ASK receiver 700 for DSRC in accordance with the present invention is formed in one-chip by a complementary metal-oxide semiconductor (CMOS) process. Because the bandpass filter 703 has a relatively low pass band of approximately 10 MHz, it may be integrated in one chip by a CMOS process.

Further, since the ASK receiver 700 for DSRC in accordance with an embodiment of the present invention uses 10 MHz frequency as an IF frequency, a separate image elimination circuit is unnecessary.

FIG. 6 is a waveform diagram showing waveforms of an RF signal and an image signal received and processed by the receiver 100 according to the present invention.

An RF signal denotes a radio frequency signal for DSRC based on a DSRC standard protocol. A center frequency of the RF signal is 5800 MHz, 5810 MHz, 5840 MHz, or 5850 MHz. When 10 MHz is set to the IF frequency, an LO frequency is 5790 MHz, 5800 MHz, 5830 MHz, or 5840 MHz in a low-side LO injection. Accordingly, in respective RF signals, a 5780 MHz, 5790 MHz, 5820 MHz, or 5830 MHz band signal is converted into a 10 MHz IF frequency signal as an image signal. However, since a signal is not allotted to 5820 MHz and 5830 MHz bands, and 5780 MHz and 5790 MHz, and these bands are bands beyond a band range defined in the DSRC standard protocol, an image elimination circuit for the image signal is unnecessary. In the same manner, in a up-side LO injection, because a frequency band of an image signal is a band in which a signal is not assigned in a standard protocol or a frequency band beyond the band range defined in the DSRC standard protocol, the image elimination circuit is unnecessary.

Since the ASK receiver 200 for DSRC in accordance with an embodiment of the present invention does include an image elimination circuit, the size and cost may be reduced.

Although the present invention have been described in detail hereinabove that the receiver 100 and the DSRC chip set 500 are used in DSRC, it is by example. For example, the receiver 100 may be used in an optional communication system within the spirit and scope of the present invention. Accordingly, all receivers using the spirit of the present invention as well as a DSRC receiver fall within the spirit and scope of the present invention.

What is claimed is:

1. A receiver comprising:
    a low noise amplifier (LNA) amplifying a received radio (RF) signal while minimizing amplification of noise included in the received RF signal;
    a mixer down-converting a frequency of an output signal of the LNA to output an intermediate frequency (IF) signal;
    a frequency synthesizer generating a predetermined frequency signal for the frequency-down conversion of the mixer and outputting the predetermined frequency signal to the mixer;
    a bandpass filter passing a necessary band of a channel in an output signal of the mixer;
    a log amplifier amplifying an output signal of the bandpass filter in log scale and outputting a received signal strength indicator of an output signal of the bandpass filter;
    a detector comparing an output of the log amplifier with a predetermined binary threshold value, outputting a first binary signal when the output of the log amplifier is less than the predetermined binary threshold value, and outputting a second binary signal when the output of the log amplifier is equal to or greater than the predetermined binary threshold value;

a switch serially connected with an output terminal of the detector; and a switch controller comparing the received signal strength indicator of the output signal of the log amplifier with an RSSI threshold, opening the switch when the received signal strength indicator is less than the RSSI threshold, and closing the switch when the received signal strength indicator is equal to or grater than the RSSI threshold.

2. The receiver according to claim 1, wherein the switch controller includes:

an analog-to-digital converter converting the received signal strength indicator into a digital signal;

an RSSI threshold generator generating the RSSI threshold; and a comparator comparing the received signal strength indicator with the RSSI threshold, and opening or closing the switch according to the comparison result.

3. The receiver according to claim 2, wherein the RSSI threshold generator includes:

a temperature sensor measuring an ambient temperature; and a look-tip table storing the RSSI threshold corresponding to the ambient temperature measured by the temperature sensor.

4. The receiver according to claim 3, wherein the receiver alternately operates in a signal reception mode receiving signals and a signal non-receiving mode receiving no signals, and the temperature sensor measures the ambient temperature once each time the signal reception mode starts.

5. An amplitude shift keying (ASK) receiver for designated short range communication (DSRC) receiving and converting a DSRC radio frequency (RF) signal of a 5.8 GHz band into a digital signal, comprising:

a low noise amplifier (LNA) amplifying the received DSRC RF signal while minimizing amplification of noise included in the received DSRC RF signal;

a mixer down-converting a frequency of an output signal of the LNA to output an intermediate frequency (IF) signal;

a frequency synthesizer generating and outputting a frequency signal for the frequency-down conversion of the mixer to the mixer;

a bandpass filter passing a necessary band of a channel in an output signal of the mixer;

a log amplifier amplifying an output signal of the bandpass filter in log scale; and a detector comparing an output of the log amplifier with a predetermined binary threshold value, outputting a first binary signal when the output of the log amplifier is less than the predetermined binary threshold value, and outputting a second binary signal when the output of the log amplifier is equal to or greater than the predetermined binary threshold value, wherein the ASK receiver for DSRC is formed in one-chip by a complementary metal-oxide semiconductor (CMOS) process and the intermediate frequency is a 10 MHz band.

* * * * *